United States Patent
Michaelis

[15] 3,678,839
[45] July 25, 1972

[54] INEXPENSIVE CAMERA
[72] Inventor: David E. Michaelis, Levittown, Pa.
[73] Assignee: Plastics Development Corporation of America, Philadelphia, Pa.
[22] Filed: July 15, 1970
[21] Appl. No.: 55,128

[52] U.S. Cl. .............................................................. 95/60
[51] Int. Cl. ......................................................... G03b 9/26
[58] Field of Search ........................... 95/53 R, 58, 59, 60

[56] References Cited

UNITED STATES PATENTS 3,254,581  6/1966  Irwin ........................................ 95/60 X
638,103  11/1899  Edgecomb ................................ 95/60 X Primary Examiner—Samuel S. Matthews
Assistant Examiner—Monroe H. Hayes
Attorney—Seidel, Gonda & Goldhammer

[57] ABSTRACT

An inexpensive camera is disclosed utilizing a simple shutter on a housing made from a material such as injected molded plastic. The housing lacks a back wall so that the film cassette will temporarily provide a back wall for the housing. The shutter comprises a first member and a second member which rotate together from a rest position to a cocked position at which point the second member is released from the first member and returns to its rest position.

8 Claims, 6 Drawing Figures

PATENTED JUL 25 1972

INVENTOR
DAVID E. MICHAELIS
BY
Seidel, Gonda & Goldhammer
ATTORNEYS.

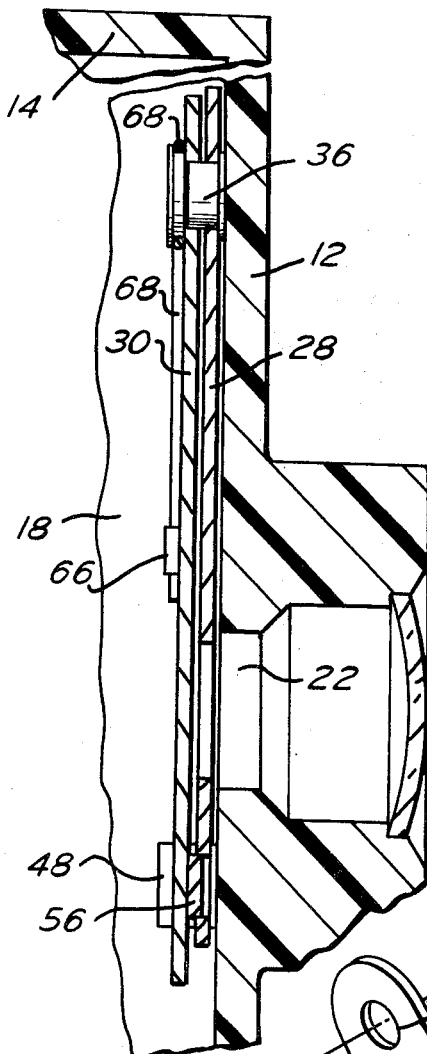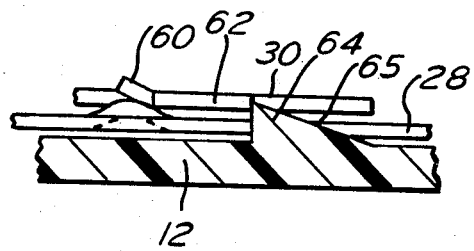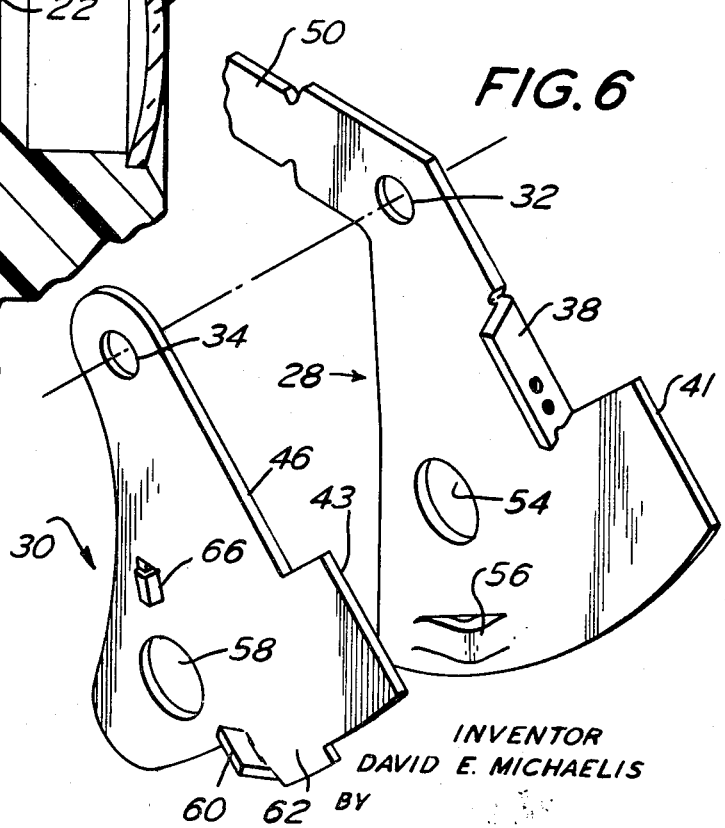

INEXPENSIVE CAMERA

The present invention is directed to an inexpensive camera which may be utilized once and disposed of. If desired, the camera may be utilized more than once. However, the object of the present invention is to provide a camera which is sufficiently inexpensive so as to be able to dispose of the camera after it is used only a single time.

The housing of the camera is made from a lightweight inexpensive material such as paper, injected molded plastic, etc. The housing lacks a rear wall. It is intended that the rear wall will be provided by the housing of the film cassette in the manner described in U.S. Pat. No. 2,381,033 wherein the cassette may have a snap-fit with the housing of the camera.

The camera is provided with a simple, reliable and inexpensive shutter mechanism supported by the front wall of the camera. The shutter mechanism comprises first and second overlying plates spring-biased to an inoperative disposition. One of the shutter mechanism plates has an extension or handle portion which extends through an opening in the side wall of the camera housing. When the handle portion is pressed downwardly, the first plate moves, then the second plate moves, then the first plate comes to rest at a limit stop, and then the second plate comes to rest. Before the second plate comes to a rest position and while the first plate has already reached a rest position, exposure of the film is made. When pressure is released from the handle portion, both plates return to a rest position under the influence of a spring bias.

It is an object of the present invention to provide a novel inexpensive camera.

It is an object of the present invention to provide an inexpensive camera which lacks a back wall and utilizes a film cassette housing as a temporary back wall for the camera housing.

It is another object of the present invention to provide a camera utilizing an inexpensive shutter mechanism comprised of first and second plates rotatably supported by the front wall of the camera housing.

Other objects will appear hereinafter.

For the purpose of illustrating the invention, there is shown in the drawings a form which is presently preferred; it being understood, however, that this invention is not limited to the precise arrangements and instrumentalities shown.

FIG. 4 is a sectional view taken along line 4—4 in FIG. 2.

FIG. 5 is a sectional view taken along line 5—5 in FIG. 2.

FIG. 6 is an exploded perspective view of the first and second plates comprising the shutter mechanism.

Figure 1:
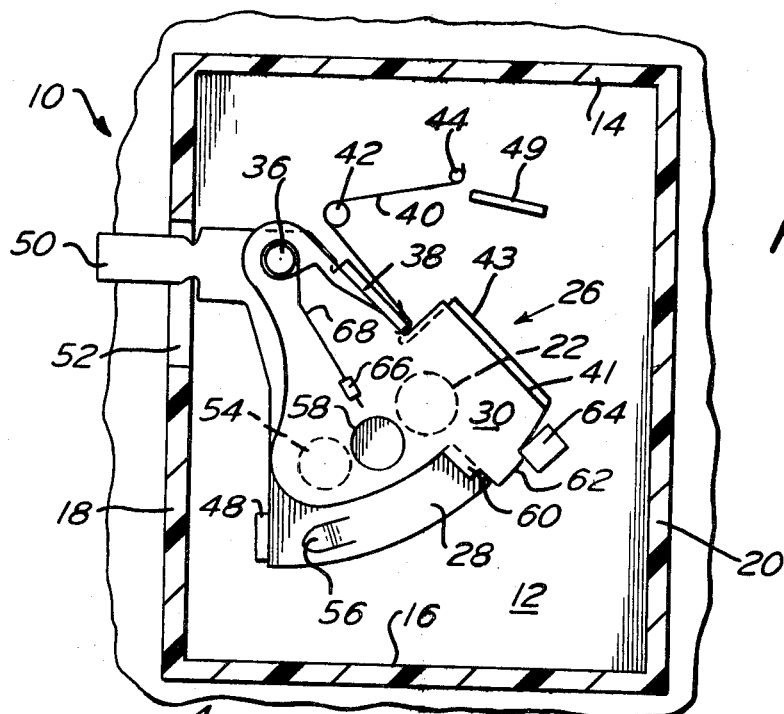
FIG. 1 is a sectional view of the camera of the present invention showing the shutter mechanism at an inoperative or at rest position.

Referring to the drawing in detail, wherein like numerals indicate like elements, there is shown an inexpensive camera in accordance with the present invention designated generally as 10. The camera 10 includes a housing having a front wall 12, a top wall 14, a bottom wall 16, and side walls 18 and 20. The camera housing lacks a rear wall. As indicated above, it is intended that the cassette housing for the film will provide a temporary rear wall by being clipped or snapped onto the open end of the camera housing. The camera housing is preferably made from inexpensive lightweight material. As illustrated, the camera housing is an injection molded housing in one integral piece.

The front wall 12 of the camera housing is provided with a lens opening 22 and has a boss projection in a surrounding coaxial position for support of a lens 24 coaxial with the lens opening 22. The front wall 12 rotatably supports a shutter mechanism designated generally as 26. The shutter mechanism 26 comprises a first plate 28 and a second smaller plate 30 overlying the same. Plates 28 and 30 may be die cut from sheet metal or a polymeric plastic or may be molded from plastic.

Plate 28 is provided with a hole 32. Plate 30 is provided with a hole 34. See FIG. 6. Plates 28 and 30 are rotatably supported by a pin 36 which is integral with the front wall 12 and extends through the holes 32 and 34. As shown more clearly in FIG. 4, plate 28 is between wall 12 and plate 30.

As shown more clearly in FIG. 6, one edge of plate 28 is bent so as to be generally perpendicular to the remainder of the plate and thereby defining a flange 38. One end of a hairpin spring 40 is connected to flange 38. Hairpin spring 40 is mounted on pin 42 which is integral with the front wall 12 and has its other end in contact with a similar pin 44 on the front wall 12. The spring 40 biases the shutter mechanism 26 to an at rest or inoperative position as shown in FIG. 1, wherein plate 28 engages limit stop 48. Limit stop 48 is integral with the front wall 12. Adjacent pin 44, there is provided a second limit stop 49 which likewise is integral with the front wall 12. Limit stops 48 and 49 define the extent of pivotable movement for the plate 28.

The hole 32 in plate 28 is between the handle portion 50 and the main body portion thereof. The handle portion 50 extends through an aperture 52 in the side wall 18 of the camera housing adjacent the front wall 12. If desired, the handle portion 50 could extend through an aperture in the front wall 12 or the mechanism could be orientated so that the handle portion 50 could extend through an aperture in the side wall 20.

The main body portion of the plate 28 is provided with an aperture 54 adapted to be aligned with the lens opening 22. Adjacent its outer periphery, the main body portion of the plate 28 is lanced so as to provide a V-shaped cam 56 for a purpose to be described hereinafter.

The second plate 30 of the shutter mechanism 26 is provided with a radially disposed flange 60 spaced from the axis of hole 34 by a distance corresponding to the distance between hole 32 and the cam 56. Flange 60 is adapted to cooperate with cam 56 and will be described hereinafter. Plate 30 is provided with a radially outwardly extending projection 62 which projects beyond the periphery of plate 28 as shown more clearly in FIGS. 1 and 2. The front wall 12 is provided with a limit stop 64 having a cam surface 65 thereon. The projection 62 abuts against the limit stop 64 in the at rest position of the shutter mechanism as shown more clearly in FIGS. 1 and 5.

Between the hole 34 and aperture 58, the body of plate 30 is provided with a prong 66. A torsion spring 68 has one end connected to the prong 66. The spring 68 extends around the pin 36 and has its other end connected to the flange 38. As shown more clearly in FIG. 6, the flange 38 on plate 28 is provided with notches and apertures to facilitate coupling one end of the springs 40 and 68 thereto.

The camera is utilized as follows:

A film cartridge is clipped on otherwise removably coupled to the open end of the camera housing. A simple conventional film advancing lever, not shown, is utilized to advance the film. The plates 28 and 30 of the shutter mechanism 26 are biased to the inoperative position shown in FIG. 1 by spring 40. When it is desired to make an exposure, finger pressure is applied to handle portion 50 which causes the plate 28 to rotate in a counterclockwise direction about pin 36.

As the plate 28 rotates, thereby compressing spring 40, the plate 30 remains stationary due to the blocking effect of limit stop 64 with projection 62. Immediately before the leading edge 41 of plate 28 contacts limit stop 49, cam 56 contacts the flange 60 and raises the plate 30 so as to increase the distance between the plates sufficient so that projection 62 may clear limit stop 64. As soon as projection 62 clears limit stop 64, plate 30 rotates in a counterclockwise direction in FIG. 1 under the influence of spring 68. As will be apparent from a comparison of FIGS. 1 and 2, the movement of plate 28 stretched spring 68 which now tends to assume its normal disposition.

Figure 3:
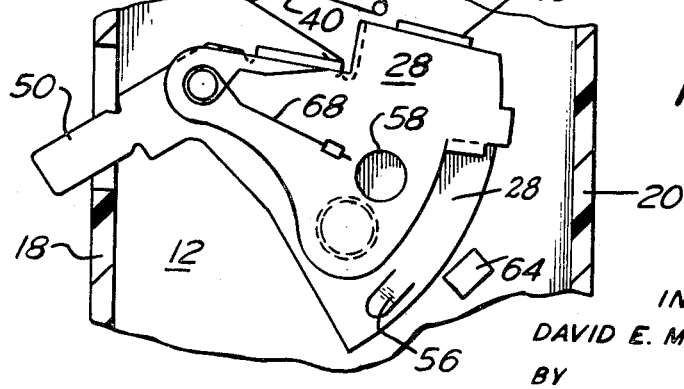
FIG. 3 is a view similar to FIG. 2 but showing the plates of the shutter mechanism immediately after exposure.

As the plate 30 moves under the bias of spring 68, plate 30 will have reached an exposure position wherein its leading edge 41 engages limit stop 49 and its aperture 54 is aligned with the lens opening 22. Plate 28 will rotate under the influence of spring 68 until its leading edge 43 engages limit stop 49. The related disposition of the plates 28 and 30 is shown in FIG. 3. As aperture 58 passed by the aligned aperture 54 and lens opening 22, the exposure was made. As will be apparent from FIG. 3, aperture 58 passes beyond the aligned lens opening 22 and aperture 54. Hence, the tension of spring 68 controls the exposure time. Spring 68 is under no tension in FIGS. 1 and 3. After an exposure is made, pressure on handle portion 50 may be released. Thereafter, spring 40 expands and returns plates 28 and 30 as a unit to the at rest or inoperative position shown in FIG. 1. While spring 40 only moves plate 28, flange 38 thereon engages edge 46 on plate 30.

Figure 2:
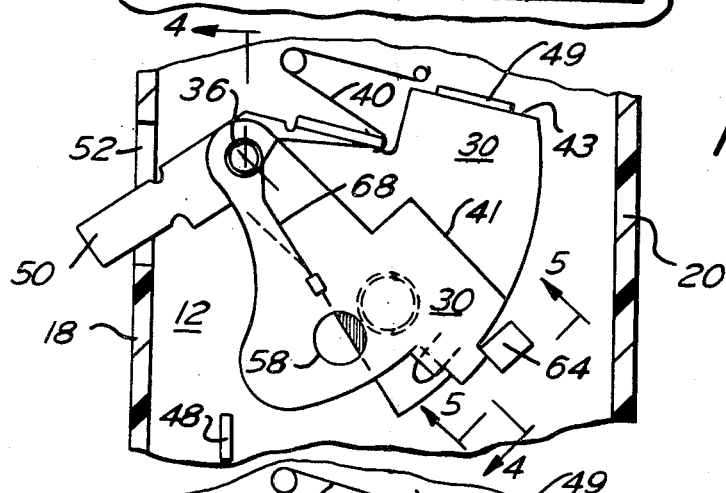
FIG. 2 is a sectional view similar to FIG. 2 but showing the plates of the shutter mechanism at an intermediate position just prior to exposure.

Thus, the sequence of events may be summed up as follows. Plate 28 rotates until cam 58 releases plate 30. Then plate 28 comes to a rest at an exposure position as shown in FIGS. 2 and 3. Thereafter, an exposure is made during that period of time where apertures 58 and 54 are aligned with the lens opening 22. Thereafter, the plate 30 continues to rotate until it comes to the rest position shown in FIG. 3. When finger pressure is released on the handle portion 50, spring 40 returns the shutter mechanism 26 to the at rest or inoperative position shown in FIG. 1.

The simplicity of the shutter mechanism 26 will be apparent from the fact that it utilizes only two movable parts and two springs. The cam surface 65 will enable the plate 30 to return to its at rest position as shown in FIG. 1 wherein projection 62 will again be blocked by limit stop 64. All of the limit stops and pins 36, 42 and 44 are integral with the front wall 12 so as to minimize the number of components of the camera 10 so that it may attain the objects set forth hereinbefore.

The present invention may be embodied in other specific forms without departing from the spirit or essential attributes thereof and, accordingly, reference should be made to the appended claims, rather than to the foregoing specification as indicating the scope of the invention.

I claim:

1. An inexpensive camera comprising a housing having a front, top, bottom and side walls, a shutter mechanism in said housing rotatably supported by the front wall, said front wall having a lens opening, said shutter mechanism comprising first and second plates, spring means biasing said plates to an inoperative position, said plates each having an aperture adapted to be aligned with said leans opening, said first plate having a handle portion to permit actuation of the shutter mechanism, spring means extending between the plates of said shutter mechanism for causing the second plate to follow the first plate, limit stop means on said front wall for temporarily retaining the second plate at its inoperative position, cam means on said first plate for causing the second plate to move in a direction away from the front wall so that it may clear said limit stop means, and a limit stop on said first plate against which the second plate will be in contact after an exposure has been made and wherein the plates will have apertures which are out of alignment.

2. A camera in accordance with claim 1 wherein said housing lacks a rear wall, said handle portion being fixed to said first plate and extending through a hole in one of said side walls, and each spring means being in a relaxed state when the shutter mechanism is in an inoperative position.

3. A camera in accordance with claim 1 wherein said first plate is between said front wall and said second plate, said plates being rotatable about a pin integral with the front wall.

4. A camera in accordance with claim 3 wherein said camera housing is a molded plastic housing having said limit stop means and said pin integral in one piece with the front wall.

5. A camera in accordance with claim 1 wherein said limit stop means has an inclined cam surface up which the second plate will ride when the second plate moves to its inoperative position under the influence of said first spring means.

6. A camera in accordance with claim 1 wherein said limit stop on said first plate pushes the second plate as the first plate moves to its inoperative position under the influence of said first-mentioned spring.

7. A camera in accordance with claim 1 wherein said cam means is located on said first plate in a position so that it moves the second plate to clear the limit stop means only after the first plate has rotated through a predetermined arc.

8. An inexpensive camera comprising a housing having a front, top, bottom and side walls, a shutter mechanism rotatably supported by the front wall, said front wall having a lens opening, said shutter mechanism comprising first and second plates, said front wall having an integral pin, spring means on said pin and biasing said plates to an inoperative position, said first plate having a handle portion to permit actuation of the shutter mechanism, spring means extending between the plates of said shutter mechanism, limit stop means on said front wall blocking the second plate, cam means on said first plate for causing the second plate to move in a direction away from the front wall so that it may clear said limit stop means, and a limit stop on said first plate against which the second plate will be in contact after an exposure has been made and wherein the plates will have apertures which are out of alignment, said housing lacking a rear wall, said handle portion extending through a hole in a side wall, said spring being in a relaxed state when the shutter mechanism is in an inoperative position, wherein said first plate is between said front wall and said second plate, said plates being rotatable about a second pin integral with the front wall, and said camera housing being a molded plastic housing having said limit stop and said pins integral in one piece with the front wall.

* * * * *